US012651494B2

(12) United States Patent
Watanabe et al.

(10) Patent No.: US 12,651,494 B2
(45) Date of Patent: Jun. 9, 2026

(54) LOG MANAGEMENT DEVICE, ELECTRONIC CONTROL SYSTEM, LOG MANAGEMENT METHOD, AND STORAGE MEDIUM STORING LOG MANAGEMENT PROGRAM

(71) Applicants: DENSO CORPORATION, Kariya-city (JP); TOYOTA JIDOSHA KABUSHIKI KAISHA, Toyota (JP)

(72) Inventors: Shogo Watanabe, Kariya-city (JP); Tokuya Inagaki, Kariya-city (JP); Ryosuke Murakami, Kariya-city (JP); Hirofumi Yamashita, Kariya-city (JP); Shinnosuke Sugawara, Toyota (JP); Takeshi Matsui, Nagoya (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 84 days.

(21) Appl. No.: 18/607,437

(22) Filed: Mar. 16, 2024

(65) Prior Publication Data

US 2024/0331467 A1 Oct. 3, 2024

(30) Foreign Application Priority Data

Mar. 27, 2023 (JP) ................................ 2023-050463

(51) Int. Cl.
*G07C 5/08* (2006.01)
*G07C 5/00* (2006.01)

(52) U.S. Cl.
CPC ............ *G07C 5/085* (2013.01); *G07C 5/008* (2013.01)

(58) Field of Classification Search
CPC ...................................................... G07C 5/085
See application file for complete search history.

(56) References Cited

U.S. PATENT DOCUMENTS

| | | | | |
|---|---|---|---|---|
| 10,484,923 | B2 * | 11/2019 | Taskin | H04W 36/385 |
| 11,397,801 | B2 * | 7/2022 | Ben-Noon | H04L 63/1425 |
| 12,261,868 | B2 * | 3/2025 | Sekiya | H04L 67/12 |
| 2022/0103583 | A1 | 3/2022 | Torisaki et al. | |
| 2024/0331467 | A1 * | 10/2024 | Watanabe | G07C 5/008 |

FOREIGN PATENT DOCUMENTS

| | | |
|---|---|---|
| JP | 2020-123307 A | 8/2020 |
| JP | 2022-055558 A | 4/2022 |

* cited by examiner

*Primary Examiner* — Michael A Berns
(74) *Attorney, Agent, or Firm* — Harness, Dickey & Pierce, PLC

(57) ABSTRACT

A log management device acquires an alive monitoring log indicating that a security sensor of an electronic control unit mounted on a vehicle is operating; records acquisition of the alive monitoring log in an alive monitoring table; identifies an unacquired alive monitoring log, and records, in the alive monitoring table, an unacquired period during which the unacquired alive monitoring log is not acquired; and invalidates a record of the unacquired alive monitoring log in the alive monitoring table when the unacquired period of the unacquired alive monitoring log is equal to or longer than a predetermined period.

19 Claims, 12 Drawing Sheets

| |
|---|
| HEADER |
| ECU ID |
| SENSOR ID |
| EVENT ID |
| COUNTER |
| TIME STAMP |
| CONTEXT DATA |

FIG. 7

| ALIVE MONITORING LOG | #1 | #2 | #3 | #4 | #5 | |
|---|---|---|---|---|---|---|
| ECU ID | 0x001 | 0x002 | 0x002 | 0x004 | 0x007 | |
| SENSOR ID | 0x01 | 0x01 | 0x02 | 0x01 | 0x02 | |
| EVENT ID | 0xF001 | 0xF003 | 0xF004 | 0xF001 | 0xF001 | ... |
| CURRENT TRIP # (A) | 10 | 10 | 10 | 10 | 10 | |
| ACQUISITION TRIP # (B) | 10 | 10 | 10 | 5 | 9 | |
| NUMBER OF UNACQUIRED TRIPS (C) | 0 | 0 | 0 | 5 | 1 | |

FIG. 10

| ALIVE MONITORING LOG | #1 | #2 | #3 | #4 | #5 | ... |
|---|---|---|---|---|---|---|
| ECU ID | | | | | | |
| SENSOR ID | | | | | | |
| EVENT ID | | | | | | |
| CURRENT TRIP # (A) | | | | | | |
| ACQUISITION TRIP # (B) | | | | | | |
| NUMBER OF UNACQUIRED TRIPS (C) | | | | | | |

FIG. 12

| | |
|---|---|
| NUMBER OF EVENT IDENTIFICATION IDS | 3 |
| ECU ID #1 | 0x001 |
| SENSOR ID #1 | 0x01 |
| EVENT ID #1 | 0xF001 |
| NUMBER OF UNACQUIRED TRIPS (C) #1 | 0 |
| ECU ID #2 | 0x002 |
| SENSOR ID #2 | 0x01 |
| EVENT ID #2 | 0xF003 |
| NUMBER OF UNACQUIRED TRIPS (C) #2 | 0 |
| ECU ID #3 | 0x002 |
| ⋮ | ⋮ |

LOG MANAGEMENT DEVICE, ELECTRONIC CONTROL SYSTEM, LOG MANAGEMENT METHOD, AND STORAGE MEDIUM STORING LOG MANAGEMENT PROGRAM

CROSS REFERENCE TO RELATED APPLICATION

This application is based on Japanese Patent Application No. 2023-050463 filed on Mar. 27, 2023, the disclosure of which is incorporated herein by reference.

TECHNICAL FIELD

The present disclosure relates to a device, a method, and a program for managing an alive monitoring log generated by a security sensor of an electronic control unit mounted on a moving object such as an automobile.

BACKGROUND

A related art discloses that an abnormality occurring due to an attack on a network is detected and data of the detected abnormality is collected, and a combination of items in which the abnormality is detected is checked against an abnormality detection pattern identified in advance for each attack to identify a type of the cyber attack corresponding to the abnormality.

SUMMARY

A log management device acquires an alive monitoring log indicating that a security sensor of an electronic control unit mounted on a vehicle is operating; records acquisition of the alive monitoring log in an alive monitoring table; identifies an unacquired alive monitoring log, and records, in the alive monitoring table, an unacquired period during which the unacquired alive monitoring log is not acquired; and invalidates a record of the unacquired alive monitoring log in the alive monitoring table when the unacquired period of the unacquired alive monitoring log is equal to or longer than a predetermined period.

BRIEF DESCRIPTION OF DRAWINGS

Objects, features and advantages of the present disclosure will become more apparent from the following detailed description made with reference to the accompanying drawings. In the drawings:

FIG. 7 is a diagram showing an alive monitoring table used in the log management device according to Embodiment 1;

FIG. 10 is a diagram showing a masking table used in the log management device according to Embodiment 2;

FIG. 12 is a diagram showing an alive monitoring table output from an external input and output unit of the log management device according to Embodiment 3.

DETAILED DESCRIPTION

Figure 1:
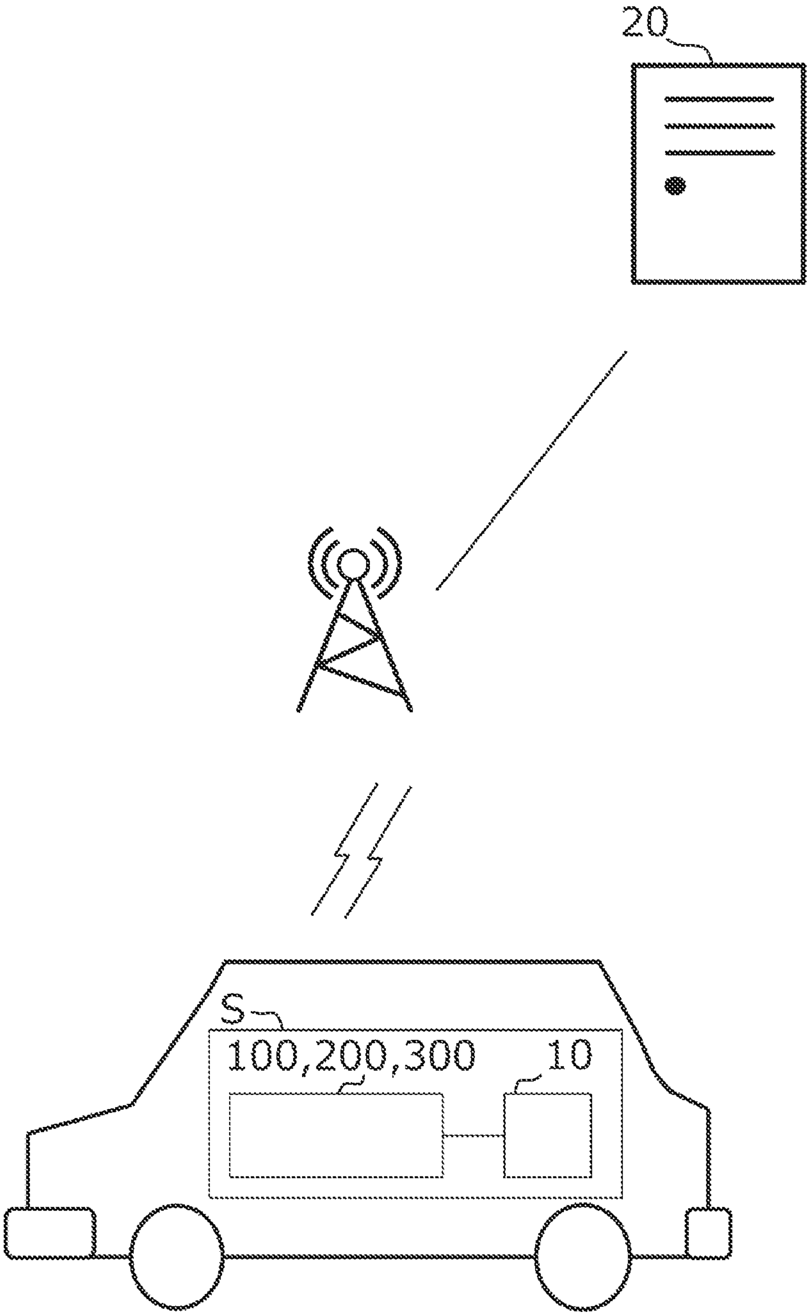
FIG. 1 is a diagram showing an arrangement of a log management device and a relationship with related devices according to embodiments.

In recent years, technologies for providing driver-assistance and autonomous driving control, such as V2X such as vehicle-to-vehicle communication or road-to-vehicle communication, have attracted attention. As a result, a vehicle has a communication function, and a so-called connectivity of the vehicle is progressing. As a result, a probability that a vehicle may receive a cyber attack called unauthorized access is increasing. Therefore, it is necessary to analyze a cyber attack on a vehicle and construct a countermeasure therefor.

There are various methods for detecting an abnormality occurring in a vehicle and analyzing a cyber attack based on the detected abnormality.

The inventors of the present application have found the following. In an existing attack identifying method as disclosed in a related art, it is necessary to identify in advance types and the number of security sensors mounted on an electronic control unit constituting an electronic control system mounted on a vehicle. However, since types and the number of the mounted electronic control units may be different depending on a type and a grade of a vehicle and a destination, it is necessary to manage a configuration of the electronic control system for each specification.

Therefore, the present disclosure provides a log management device and the like capable of minimizing management of the types and the number of security sensors for each electronic control system.

According to one aspect of the present disclosure, a log management device comprises: a log acquisition unit configured to acquire an alive monitoring log indicating that a security sensor of an electronic control unit mounted on a vehicle is operating; an alive monitoring log recording unit configured to record acquisition of the alive monitoring log in an alive monitoring table; an unacquired alive monitoring log recording unit configured to identify an unacquired alive monitoring log which is not acquired by the log acquisition unit, and record, in the alive monitoring table, an unacquired period during which the unacquired alive monitoring log is not acquired; and an invalidation unit configured to invalidate a record of the unacquired alive monitoring log in the alive monitoring table when the unacquired period of the unacquired alive monitoring log is equal to or longer than a predetermined period.

According to another aspect of the present disclosure, an electronic control system, a log management method executed by a log management device, and a non-transitory computer-readable storage medium storing a log management program executable by a log management device are provided.

With the above-described configuration, a log management device or the like according to the present disclosure can minimize, by using an alive monitoring log, management of types and the number of security sensors for each electronic control system.

Embodiments of the present disclosure will be described below with reference to the drawings.

Effects described in the embodiments are effects when the configurations of the embodiments are provided as examples of the present disclosure, and are not necessarily effects of the present disclosure.

When there are multiple embodiments (including modifications), the configurations disclosed in the embodiments are not limited to the embodiments, and can be combined across the embodiments. For example, the configuration disclosed in one embodiment may be combined with other embodiments. The disclosed configurations in respective multiple embodiments may be collected and combined.

(Prerequisite Configuration for Each Embodiment)

(Arrangement of Log Management Device and Relationship with Related Device)

Figure 2:
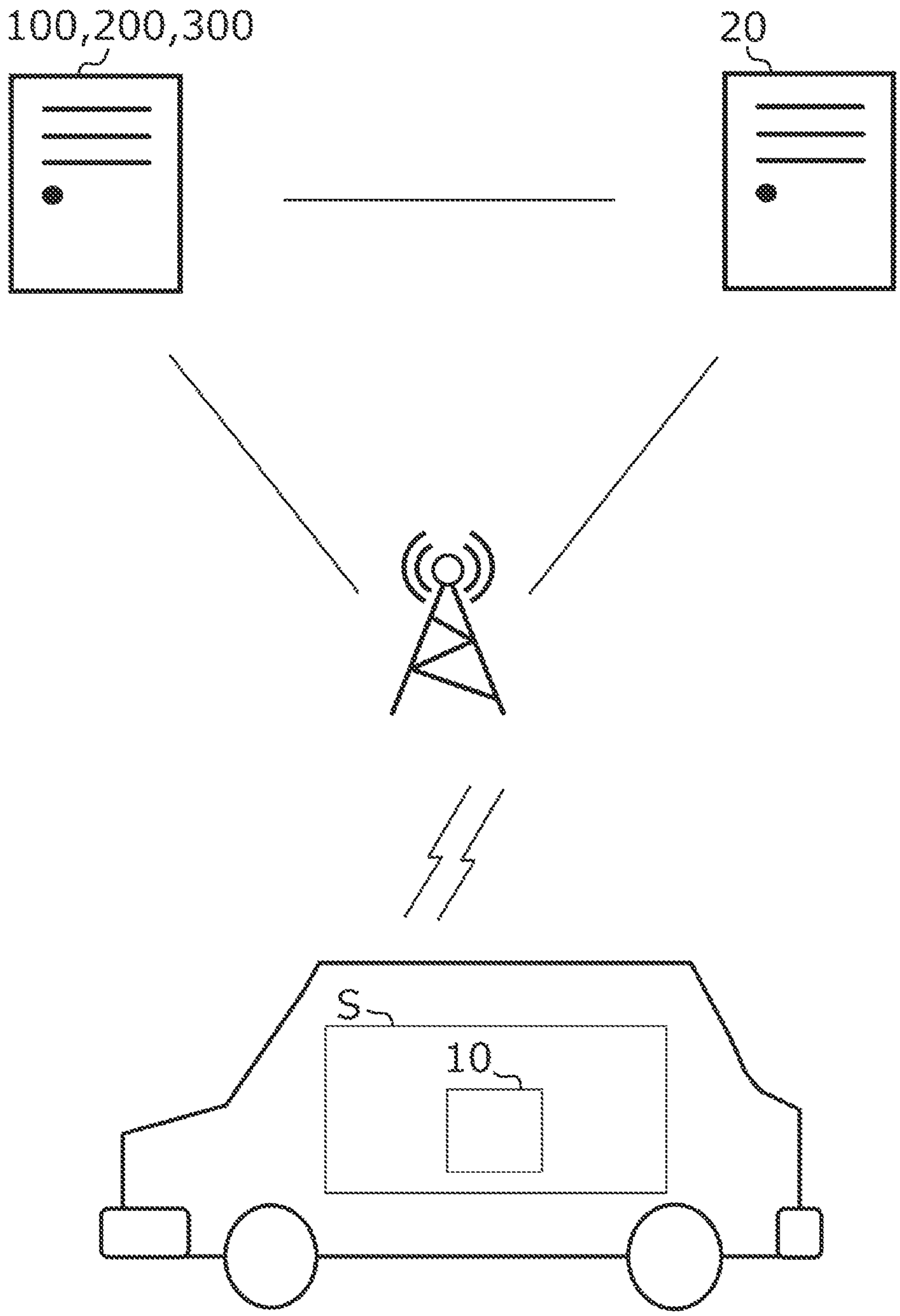
FIG. 2 is a diagram showing an arrangement of the log management device and the relationship with the related devices according to the embodiments.

FIGS. 1 and 2 are diagrams showing an arrangement of a log management device and a relationship with related devices according to embodiments. For example, as shown in FIG. 1, a case in which a log management device 100, a log management device 200, or a log management device 300 (hereinafter, collectively referred to as the log management device 100 or the like) is "mounted" on a "vehicle" together with an electronic control unit 10 constituting an electronic control system S and, as shown in FIG. 2, a case in which the electronic control unit 10 constituting the electronic control system S is "mounted" on a "vehicle" and the log management device 100 or the like is implemented by a server device or the like provided outside the vehicle are assumed. In the embodiments to be described later, the case in which the log management device 100 or the like is mounted on a vehicle as shown in FIG. 1 will be described. In the case in which the log management device 100 or the like is not mounted on the vehicle as shown in FIG. 2, the description of each embodiment will be cited because the description is the same as each embodiment except that a communication method with the electronic control unit 10 is different. The term "vehicle" refers to a movable object, and has a travel speed of any value. In addition, a case in which the vehicle is stopped is also included. Examples of the vehicle include, but are not limited to, an automobile, a motorcycle, a bicycle, and an object mounted thereon. The term "mounted" includes not only a case in which an object is directly fixed to the vehicle but also a case in which an object is moved together with the vehicle although the object is not fixed to the vehicle. Examples thereof include one carried by a person in the vehicle, and one mounted on a load placed in the vehicle.

The log management device 100 and the like are connected to an "electronic control unit" (hereinafter, referred to as an ECU) constituting the electronic control system. The log management device 100 or the like is a device that acquires and manages a security log generated by security sensors mounted on multiple ECUs 10 constituting the electronic control system S. Here, the "electronic control unit" may be a physically independent electronic control unit or a virtualized electronic control unit implemented using a virtualization technique.

An external device 20 is any device provided outside the vehicle, and an example thereof is a security operations center (SOC) that detects and analyzes a cyber attack.

In FIG. 1, the electronic control system S and the external device 20 are connected via a communication network using a wireless communication system such as IEEE 802.11 (Wi-Fi (registered trademark)), IEEE 802.16 (WiMAX (registered trademark)), wideband code division multiple access (W-CDMA), high speed packet access (HSPA), long term evolution (LTE), long term evolution advanced (LTE-A), 4G, or 5G. Alternatively, dedicated short range communication (DSRC) can be used. When the vehicle is parked in a parking lot or accommodated in a repair shop, a wired communication system can be used instead of the wireless communication system. For example, a local area network (LAN), the Internet, or a fixed telephone line may be used. In addition, a line combining the wireless communication system and the wired communication system may be used. For example, the electronic control system S and a base station device in a cellular system may be connected to each other by a wireless communication system such as 4G, and the base station device and the external device 20 may be connected to each other by a wired communication system such as a backbone line of a communication carrier or the Internet. A gateway device may be provided at a point of contact between the backbone line and the Internet.

In FIG. 2, the electronic control system S and the log management device 100 or the like provided outside the vehicle are also connected via a communication network using the wireless communication system or the wired communication system described above. In FIG. 2, although the log management device 100 and the like and the external device 20 are described as separate devices connected by a communication network, the log management device 100 and the like and the external device 20 may be implemented by the same device.

(Configuration of Electronic Control System S)

Figure 3:
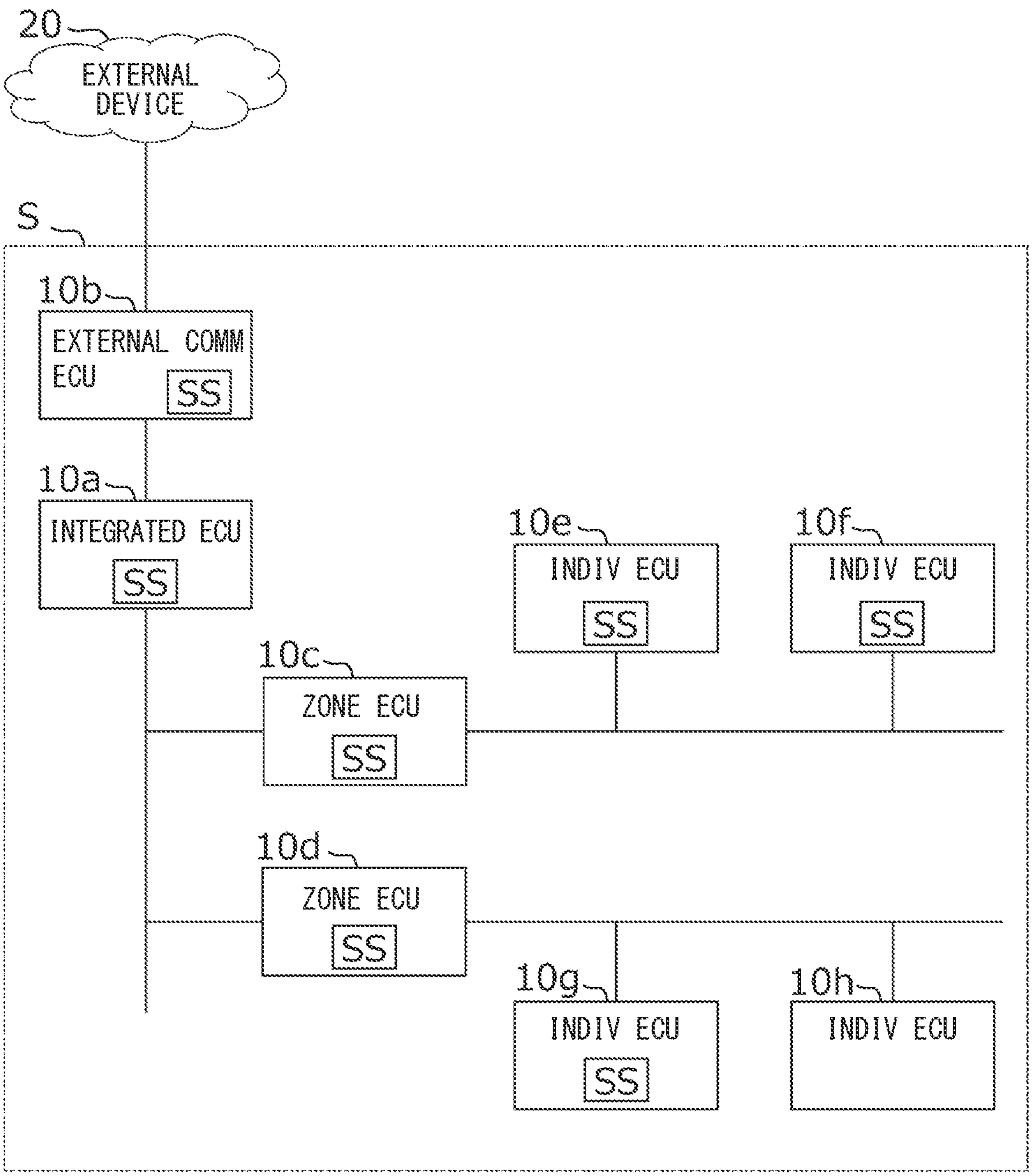
FIG. 3 is a diagram showing a configuration example of an electronic control system according to the embodiments.

FIG. 3 is a diagram showing a configuration example of the electronic control system S. The electronic control system S includes the multiple ECUs 10 and an in-vehicle network connecting the ECUs 10. Although FIG. 2 shows eight ECUs (ECU 10*a* to ECU 10*h*) as an example, naturally, the electronic control system S includes any number of ECUs. In the following description, when a single electronic control unit or multiple electronic control units are comprehensively described as a whole, the electronic control unit is described as the ECU 10 or each ECU 10, and when individual electronic control units are identified and described, the electronic control unit is described as the ECU 10*a*, the ECU 10*b*, the ECU 10*c*, and the like.

In the case of FIG. 3, the ECUs 10 are connected to one another via an in-vehicle communication network such as controller area network (CAN) and local interconnect network (LIN). Alternatively, the ECUs 10 may be connected by using any communication system such as Ethernet (registered trademark), Wi-Fi (registered trademark), and Bluetooth (registered trademark) regardless of wired and wireless. The connection refers to a state in which data can be exchanged, and includes a case in which different pieces of hardware are connected via a wired or wireless communication network and a case in which virtual ECUs (alternatively, referred to as virtual machines) implemented on the same piece of hardware are virtually connected.

The electronic control system S shown in FIG. 3 includes an integrated ECU 10*a*, an external communication ECU 10*b*, zone ECUs (10*c*, 10*d*), and individual ECUs (10*e* to 10*h*).

The integrated ECU 10*a* has a function of controlling the entire electronic control system S and a gateway function of mediating communication between the ECUs. The integrated ECU 10*a* may be referred to as a gateway ECU (G-ECU) or a mobility computer (MC). The integrated ECU 10*a* may be a relay device or a gateway device.

The external communication ECU 10*b* is an ECU including a communication unit that communicates with the external device 20 provided outside the vehicle. The communication system used by the external communication ECU 10*b* is the wireless communication system or the wired communication system described above. In order to implement multiple communication systems, multiple external communication ECUs 10*b* may be provided. Instead of providing the external communication ECU 10*b*, the integrated ECU 10*a* may include the function of the external communication ECU 10*b*.

Each of the zone ECUs (10*c*, 10*d*) is an ECU having a gateway function that is appropriately arranged according to a location where the individual ECU is disposed or a function thereof. For example, the zone ECU 10*c* is an ECU having a gateway function of mediating communication between the individual ECU 10*e* and the individual ECU 10*f* disposed in front of the vehicle and another ECU 10, and the zone ECU 10*d* is an ECU having a gateway function of mediating communication between the individual ECU 10*g* and the individual ECU 10*h* disposed in rear of the vehicle and another ECU 10.

The individual ECUs (10*e* to 10*h*) can be implemented by ECUs having any functions. For example, there are a drive system electronic control unit controlling an engine, a steering wheel, a brake, and the like, a vehicle body system electronic control unit controlling a meter, a power window, and the like, an information system electronic control unit such as a navigation apparatus, or a safety control system electronic control unit performing control for preventing collision with an obstacle or a pedestrian. The ECUs may be classified into a master and a slave instead of being in parallel.

In the electronic control system S of FIG. 3, a security sensor is mounted in each ECU 10 other than the ECU 10*h* (abbreviated as SS in the drawing). As described above, it is not necessary for the security sensors to be mounted on all the ECUs 10 constituting the electronic control system S. The security log generated by the security sensor will be described later.

In the embodiments, a case in which the log management device 100 and the like are provided in the integrated ECU 10*a* will be described as an example. However, the log management device 100 and the like may be provided in the external communication ECU 10*b*, the zone ECUs (10*c*, 10*d*), or the individual ECUs (10*e* to 10*h*). When provided in one of the individual ECUs (10*e* to 10*h*), it is desirable to use a dedicated ECU for implementing the log management device 100 and the like.

(Detection Log and Alive Monitoring Log)

Figures 4, 5:
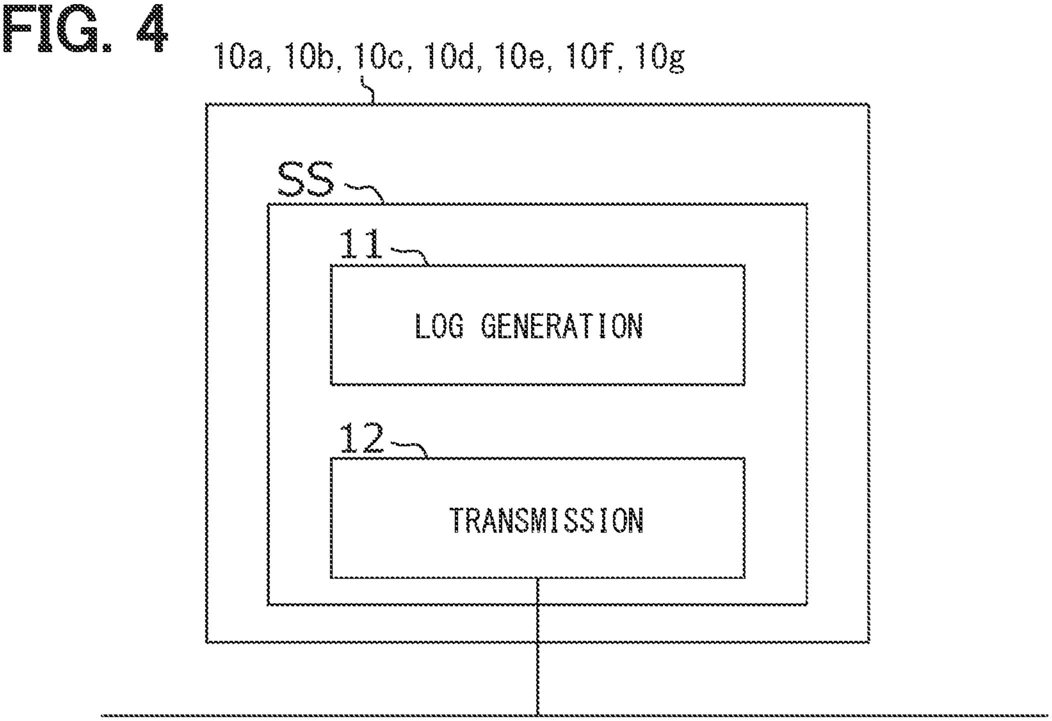
FIG. 4 is a diagram showing a configuration of an electronic control unit according to the embodiments.
FIG. 5 is a diagram showing a security log generated by a security sensor of the electronic control unit according to the embodiments.

FIG. 4 is a block diagram showing a configuration of the ECUs (10*a* to 10*g*) on which the security sensor is mounted. The ECUs (10*a* to 10*g*) each include a log generation unit 11 and a transmission unit 12.

The log generation unit 11 generates two types of security logs, a detection log and an alive monitoring log. FIG. 5 is a diagram showing a specific example of the security log. The security log includes fields of an ECU ID indicating identification information of the ECU 10 on which the security sensor is mounted, a sensor ID indicating identification information of the security sensor, an event ID indicating identification information of a security event, a counter indicating the number of occurrences of an event, a time stamp indicating an occurrence time point of the event, and context data indicating details of an output of the security sensor. The security log may further include a header that stores information indicating a version of a protocol and a state of each field.

The detection log is a security log generated when a cyber attack on each ECU 10 on which the security sensor is mounted is detected. That is, a timing at which the detection log is generated is when a cyber attack is detected.

In contrast, the alive monitoring log is a security log indicating that the security sensor is operating. The alive monitoring log is a security log generated for a usage that the fact that the security sensor is operating can be estimated if the log is generated.

The timing at which the alive monitoring log is generated is not related to the detection of the cyber attack. For example, the alive monitoring log is generated every "constant cycle", for example, every 10 seconds. Alternatively, the alive monitoring log may be generated at a specific timing, for example, when ignition of the vehicle is turned on. Here, the "constant cycle" includes not only a case in which the cycle is always constant but also a case in which the cycle is determined depending on conditions.

In order to distinguish the alive monitoring log from the detection log, it is desirable to assign an ID different from the detection log to the alive monitoring log. For example, when the event ID is formed of 16 bits, upper 4 bits may be set to 1 (that is, 0xF***(* is any number) in hexadecimal notation) to indicate that the event ID is the alive monitoring log. The ID different from the detection log may be assigned to an ID other than the event ID, that is, the ECU ID or the sensor ID, or any combination of the three IDs. The field of the context data may not be provided in the alive monitoring log.

Returning to FIG. 4, the transmission unit 12 transmits the security log generated by the log generation unit 11 to the log management device 100 or the like via the in-vehicle network. When the security sensor and the log management device 100 or the like are mounted on the same ECU 10, the security log is directly output to hardware or software implementing the log management device 100 or the like without going through the in-vehicle network.

The security log generated by the security sensor is referred to as SEv, and a qualified security log that is already narrowed down is referred to as QSEv. For example, the security sensor generates the SEv and reports the SEv to an intrusion detection system manager (IdsM), and when the SEv passes through a certification filter in the IdsM and satisfies a specified criterion, the SEv is set as the QSEv and transmitted from an intrusion detection reporter to the outside of the vehicle. The security log in the embodiments is a concept including both the SEv and the QSEv. When the security log is the QSEv, a range including the intrusion detection system manager (IdsM) corresponds to the log generation unit 11, and the intrusion detection reporter corresponds to the transmission unit 12.

Embodiment 1

(Configuration of Log Management Device 100)

Figure 6:
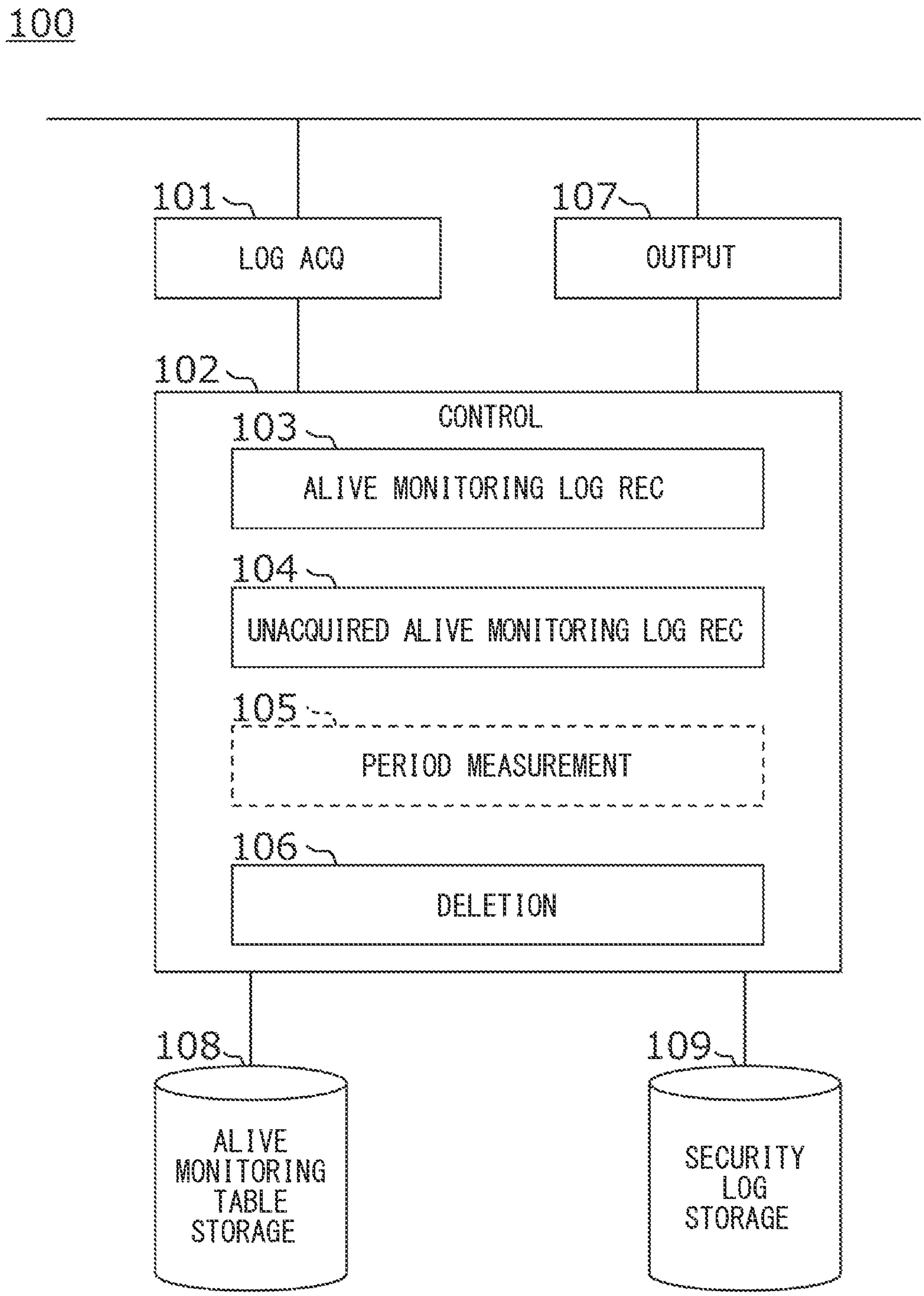
FIG. 6 is a block diagram showing a configuration example of a log management device according to Embodiment 1.

FIG. 6 is a block diagram showing a configuration of the log management device 100 according to the present embodiment. The log management device 100 includes a log acquisition unit 101, a control unit 102, an output unit 107, an alive monitoring table storage unit 108, and a security log storage unit 109. The control unit 102 implements, using hardware and/or software, an alive monitoring log recording unit 103, an unacquired alive monitoring log recording unit 104, and a deletion unit 106.

The log acquisition unit 101 acquires the security log generated by the security sensor mounted in each of the multiple ECUs 10 constituting the electronic control system S, that is, the detection log and the alive monitoring log. The security log is acquired via the in-vehicle network from the security sensor mounted on the ECU 10 other than the integrated ECU 10*a* on which the log management device 100 is mounted, and is directly acquired from the security sensor mounted on the integrated ECU 10*a* without going through the in-vehicle network.

The alive monitoring log recording unit 103 "records" in an alive monitoring "table" that the log acquisition unit 101 "acquires the alive monitoring log". Here, "recording that the alive monitoring log is acquired" includes not only recording the fact that the alive monitoring log is acquired, but also recording indirect facts that can lead to the fact that the alive monitoring log is acquired. For example, in addition to recording identification information for identifying the alive monitoring log, information such as the number of times of acquisition or an acquisition time of the alive monitoring log, or a flag indicating other types of acquisition is also recorded. The "table" is not limited to a table format as long as the table is a collection of data.

FIG. 7 is a diagram showing the alive monitoring table. The ECU ID, the sensor ID, and the event ID of the alive monitoring log acquired by the log acquisition unit 101 are recorded in an ECU ID, a sensor ID, and an event ID in FIG. 7. Hereinafter, the ECU ID, the sensor ID, and the event ID may be collectively referred to as an event identification ID. In FIG. 7, although the ECU ID is 12 bits, the sensor ID is 8 bits, and the event ID is 16 bits, lengths of the IDs each are an example, and may be other than these. Instead of the event ID of the alive monitoring log, the event ID of the corresponding detection log may be recorded.

A current trip number (A) indicates a current number of a trip which is a period from start to termination of the log management device 100 or a period from ignition ON to ignition OFF of the vehicle. For example, the current trip number is updated by overwriting a previously recorded trip number with a trip number incremented at an ignition ON timing. In FIG. 7, the current trip number is 10.

An acquisition trip number (B) indicates a trip number when the log acquisition unit 101 acquires the alive monitoring log. For example, when the alive monitoring log is acquired at the time of the current trip, the current trip number (A) is copied, that is, recorded in the acquisition trip number (B). In FIG. 7, the log acquisition unit 101 acquires alive monitoring logs #1, #2, and #3 in trips having a trip number 10. In contrast, the log acquisition unit 101 acquires an alive monitoring log #4 in a trip having a trip number 5, and does not acquire the alive monitoring log #4 since then until the trip having the trip number 10. The log acquisition unit 101 acquires an alive monitoring log #5 in a trip having a trip number 9, and does not acquire the alive monitoring log #5 in the trip having the trip number 10.

In the present embodiment, when the log acquisition unit 101 acquires an alive monitoring log that has not been acquired before, the alive monitoring log recording unit 103 newly records the event identification ID of the acquired alive monitoring log in the alive monitoring table. When the log acquisition unit 101 acquires the alive monitoring log, the alive monitoring log recording unit 103 records the trip number when the alive monitoring log is acquired in the acquisition trip number (B) of the alive monitoring table.

Returning to FIG. 6, the unacquired alive monitoring log recording unit 104 identifies an unacquired alive monitoring log which is not acquired by the log acquisition unit 101, and records, in the alive monitoring table, an "unacquired period" during which the unacquired alive monitoring log is not acquired. Here, the "unacquired period" only needs to be able to identify a temporal length, and includes a time point, a time, and the number of times.

In FIG. 7, the number of unacquired trips (C) indicates the number of consecutive trips in which the log acquisition unit 101 does not acquire the alive monitoring log. For example, a value obtained by subtracting the acquisition trip number (B) from the current trip number (A) is the number of unacquired trips (C). In FIG. 7, since the log acquisition unit 101 acquires the alive monitoring logs #1, #2, and #3 for the current trip number 10, the number of unacquired trips (C) is 0. In contrast, since the log acquisition unit 101 does not acquire the alive monitoring log #4 since the trip number 5, the number of unacquired trips (C) is 5. Since the log acquisition unit 101 does not acquire the alive monitoring log #5 since the trip number 9, the number of unacquired trips (C) is 1.

In the present embodiment, when the number of unacquired trips obtained by subtracting the acquisition trip number (B) from the current trip number (A) of the alive monitoring table is one or more, the unacquired alive monitoring log recording unit 104 identifies the alive monitoring log which is not acquired by the log acquisition unit 101, that is, the unacquired alive monitoring log. The unacquired alive monitoring log recording unit 104 subtracts the acquisition trip number (B) from the current trip number (A), and records a result thereof in the number of unacquired trips (C), thereby recording the unacquired period during which the unacquired alive monitoring log is not acquired. A timing at which the subtraction and the recording are executed may be a real time, or may be collectively executed when the ignition is turned off or when the ignition is turned on next time.

It is possible to identify the ECU 10 that does not constitute the electronic control system by identifying the unacquired alive monitoring log by the unacquired alive monitoring log recording unit 104. That is, the ECU 10 having the ECU ID and the sensor ID same as those of the unacquired alive monitoring log is an ECU that does not constitute the electronic control system, and corresponds to, for example, the ECU 10 removed from the electronic control system S in the middle or the failed ECU 10.

Returning to FIG. 6, the deletion unit 106 (corresponding to an "invalidation unit") "invalidates" a record of the unacquired alive monitoring log in the alive monitoring table when the unacquired period of the unacquired alive monitoring log is a "predetermined period" "or longer". In the present embodiment, the deletion unit 106 invalidates the record of the unacquired alive monitoring log by deleting the unacquired alive monitoring log from the alive monitoring table. Here, the "predetermined period" may be any period that directly or indirectly indicates a temporal length, and examples thereof include a time and the number of times. The period may be constant or may change depending on conditions. The term "or longer" includes both cases of including and not including a case in which the period is the same as the predetermined period to be compared. The term "invalidate" means that it is sufficient to handle the alive monitoring log recorded in the alive monitoring table as not existing.

In the present embodiment, the predetermined period is defined in unit of trip, which is a period from the start to the termination of the log management device 100 or a period from the ignition ON to the ignition OFF of the vehicle. The predetermined period is defined as a case in which the trip occurs a predetermined number of times, for example, five times consecutively.

For example, in FIG. 7, the alive monitoring log #4 is acquired when the last trip acquired is the trip number 5, and as indicated by the number of unacquired trips (C), there are five consecutive trips in which the alive monitoring log #4 is not acquired. The deletion unit 106 deletes a column of the alive monitoring log #4 from the alive monitoring table.

When the predetermined period is set to be short, in addition to the removed ECU 10 and the failed ECU 10, the ECU 10 in which a temporary failure occurs can also be detected. When the predetermined period is set to be longer, the ECU 10 in which the temporary failure occurs can be excluded from a detection target. For example, when the predetermined period is set as the number of trips, when the number of trips is one, it is possible to detect even the ECU 10 in which the temporary failure occurs. When the number of trips is set to two or more, since the temporary failure does not occur in consecutive trips due to reset of each ECU 10 in each trip in many cases, only the removed ECU 10 and the failed ECU 10 can be detected.

The output unit 107 transmits the detection log to the external device 20 when the unacquired period of the unacquired alive monitoring log is equal to or longer than the predetermined period. For example, in FIG. 7, since the trip in which the alive monitoring log #4 is not received occurs five times consecutively, the output unit outputs the detection log reporting the fact to the external device 20. The detection log may be generated and transmitted in the form of FIG. 5. At this time, the event identification ID of the alive monitoring log #4 is recorded in context data of the detection log. An identifier that identifies an event for which the alive monitoring log is not received for the predetermined period or longer is recorded in an event ID of the detection log. In the present embodiment, the predetermined period used for the determination by the deletion unit 106 is the same as the predetermined period used for the determination by the output unit 107, and may be different periods. For example, by setting the former predetermined period to be longer than the latter predetermined period, it is possible to report the record of the unacquired alive monitoring log to the external device 20 before deleting the record of the unacquired alive monitoring log from the alive monitoring table, and thus it is possible to intervene the determination of the external device 20 before deleting the record of the unacquired alive monitoring log.

The alive monitoring table storage unit 108 stores the alive monitoring table. The security log storage unit 109 stores the security log acquired by the log acquisition unit 101. The alive monitoring table storage unit 108 and the security log storage unit 109 may be either an external storage device (hard disk, USB memory, CD/BD, and the like) or an internal storage device (RAM and the like). The alive monitoring table storage unit 108 may be volatile or non-volatile, whereas it is particularly desirable to manage the alive monitoring table as non-volatile data, and thus it is desirable that the alive monitoring table storage unit 108 that stores the alive monitoring table is non-volatile.

(Operation of Log Management Device 100)

Figure 8:
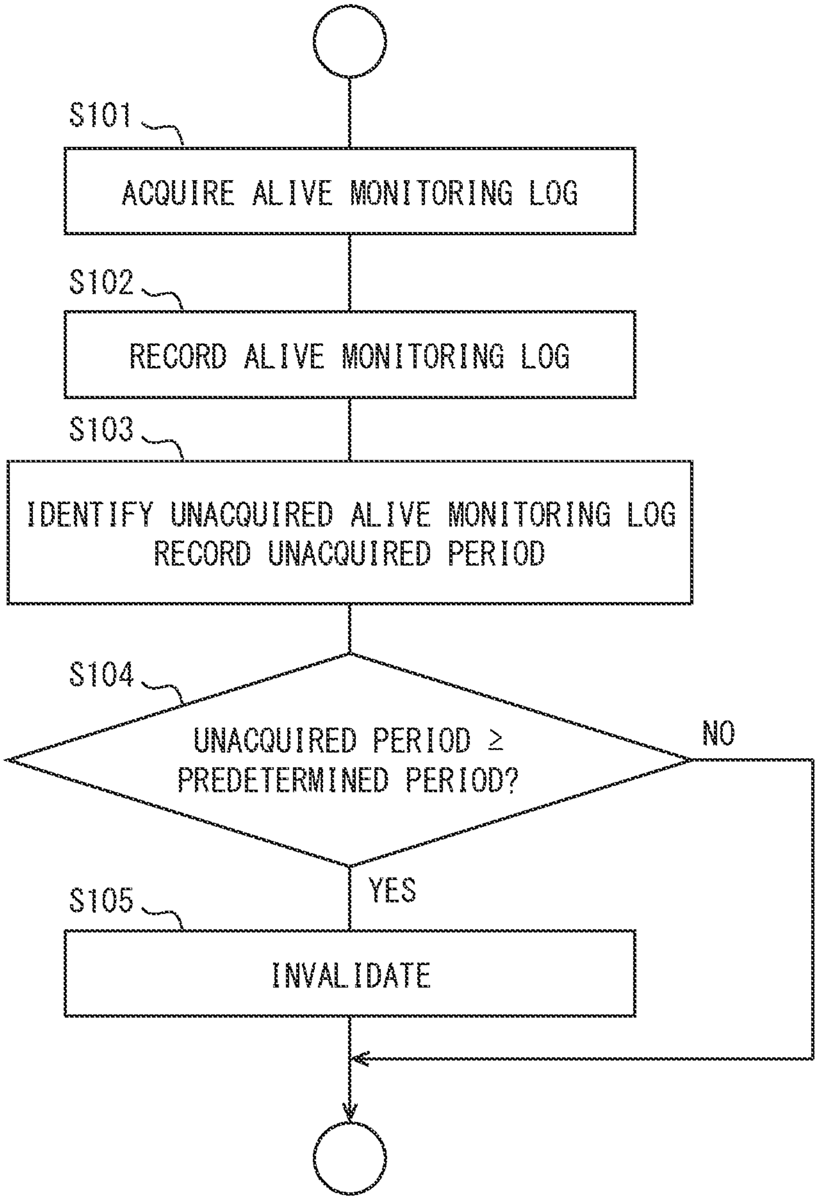
FIG. 8 is a flowchart showing an operation of the log management device according to Embodiment 1.

Next, an operation of the log management device 100 will be described with reference to FIG. 8. FIG. 8 shows not only a log management method executed by the log management device 100 but also a processing procedure of a log management program executable by the log management device 100. The processing is not limited to an order shown in FIG. 8. That is, the order may be changed as long as there are no restrictions such as a relationship in which a result of the preceding step is used in a certain step. The same applies to other embodiments.

The log acquisition unit 101 acquires an alive monitoring log indicating that the security sensor of the ECU 10 mounted on the vehicle is operating (S101). The acquired alive monitoring log is stored in the security log storage unit 109. The alive monitoring log recording unit 103 records acquisition of the alive monitoring log by the log acquisition unit 101 in the alive monitoring table stored in the alive monitoring table storage unit 108 (S102). The unacquired alive monitoring log recording unit 104 identifies an unacquired alive monitoring log which is not acquired by the log acquisition unit 101, and records, in the alive monitoring table stored in the alive monitoring table storage unit 108, an unacquired period during which the unacquired alive monitoring log is not acquired (S103). The deletion unit 106 compares the unacquired period of the unacquired alive monitoring log with a predetermined period (S104). When the unacquired period is equal to or longer than the predetermined period (S104: Y), the deletion unit 106 invalidates, that is, deletes the record of the unacquired alive monitoring log in the alive monitoring table (S105). When the unacquired period is shorter than the predetermined period (S104: N), the processing ends.

As described above, according to the present embodiment, since the electronic control unit constituting the electronic control system is identified using the alive monitoring log, it is not necessary to have information of the electronic control unit constituting the electronic control system in advance. It is possible to identify the ECU removed from the electronic control system or the failed ECU by identifying the unacquired alive monitoring log based on an acquisition state of the alive monitoring log. When the unacquired period of the unacquired alive monitoring log is equal to or longer than the predetermined period, the record of the unacquired alive monitoring log is deleted from the alive monitoring table, and thus a size of the alive monitoring table can be reduced, and a capacity of the alive monitoring table storage unit and a capacity of an internal storage device such as the RAM can be prevented from being compressed. Since the electronic control unit that actually constitutes the electronic control system can be identified from the alive monitoring log recorded in the alive monitoring table after deleting the record of the unacquired alive monitoring log, it is possible to reduce a determination target of an abnormality detection pattern of a cyber attack and to reduce calculation required for identifying a type of the cyber attack.

(Modification 1)

In the present embodiment, although the predetermined period is the number of consecutive trips in which the alive monitoring log is not received, the predetermined period may be "measured" instead. Here, the term "measure" includes not only a case of measuring a time but also a case of detecting occurrence of an event serving as a trigger to obtain a period or the number of times.

In FIG. 6, a period measurement unit 105 measures the predetermined period. For example, in addition to measuring a constant time such as 24 hours, measurement of a non-constant time such as a time from start to termination of the log management device 100 or a time from ignition ON to ignition OFF is also included.

When the period from the start to the termination of the log management device 100 or the period from the ignition ON to the ignition OFF is set as the trip as in the present embodiment, the period measurement unit 105 may measure, that is, count the number of trips defined in unit of trip.

(Modification 2)

The alive monitoring table according to the present embodiment is assumed to be empty when the vehicle is started for the first time, that is, when the vehicle is new. Further, at the end of a trip or at the start of a trip, the alive monitoring table is not reset, and the alive monitoring table at the end of the previous trip is taken over and used.

In general, the number and types of ECUs mounted on high-price and high-functionality vehicles are larger than the number and types of ECUs mounted on vehicles in a volume zone. There are not only ECUs mounted only on the former vehicle, but also ECUs mounted only on the latter vehicle. Therefore, in the alive monitoring table according to the present modification, all known alive monitoring logs of the ECUs 10 that may be mounted are registered when the vehicle is started for the first time.

By using such an alive monitoring table, it is also possible to identify the ECU 10 that does not constitute the electronic control system by identifying the unacquired alive monitoring log. The deletion unit 106 can obtain a result same as that in Embodiment 1 by deleting the alive monitoring log corresponding to the unacquired alive monitoring log from the alive monitoring table.

Embodiment 2

(Configuration of Log Management Device 200)

The log management device 100 according to Embodiment 1 invalidates the record of the unacquired alive monitoring log from the alive monitoring table. In the present embodiment, the record of the unacquired alive monitoring log is not deleted from the alive monitoring table, but is invalidated by recording in a masking table.

Figure 9:
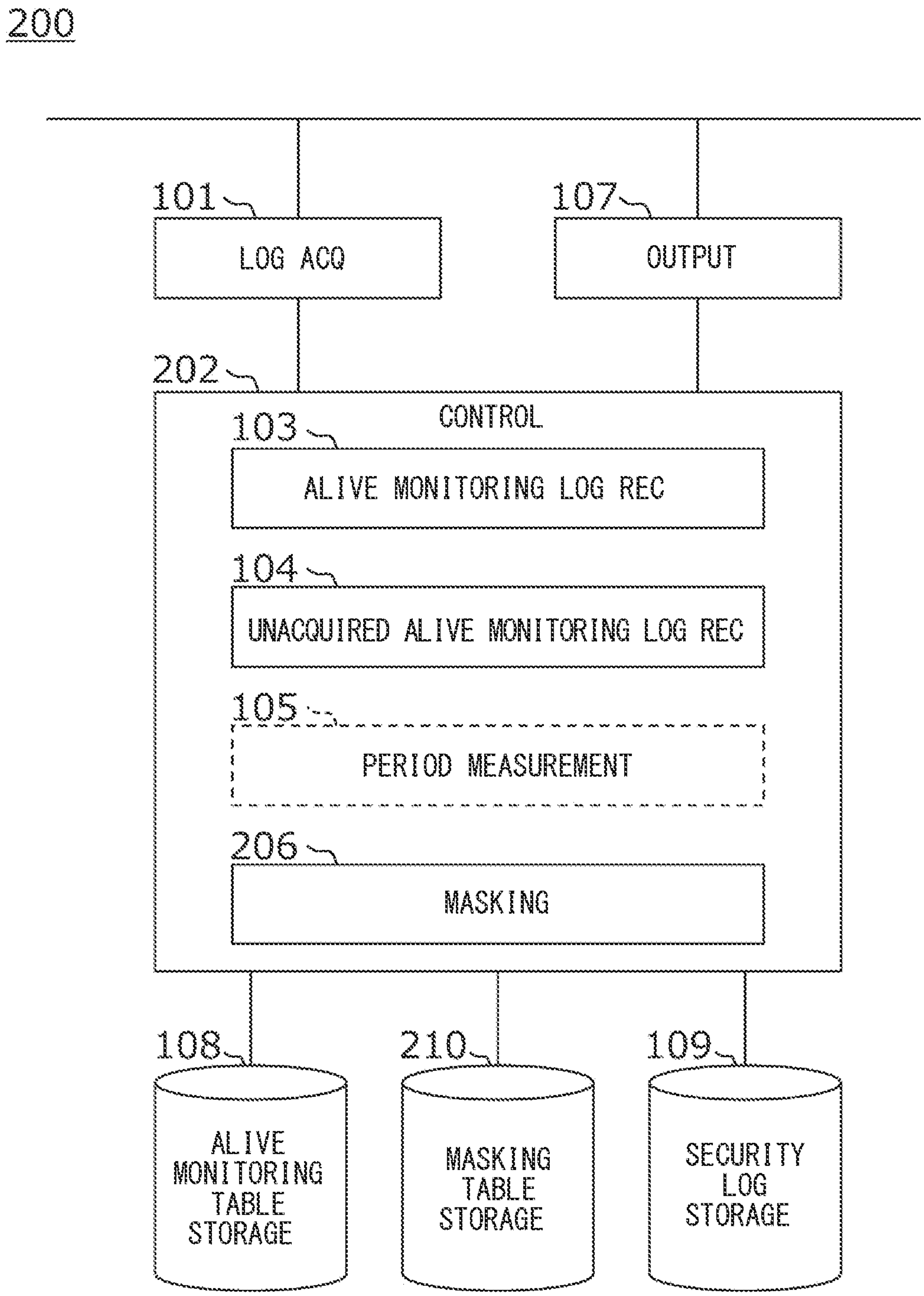
FIG. 9 is a block diagram showing a configuration example of a log management device according to Embodiment 2.

FIG. 9 is a block diagram showing a configuration of the log management device 200 according to the present embodiment. Configurations same as those of the log management device 100 in Embodiment 1 shown in FIG. 6 are denoted by the same reference numerals as those in FIG. 6, and the description of Embodiment 1 is cited. The log management device 200 includes the log acquisition unit 101, a control unit 202, the output unit 107, the alive monitoring table storage unit 108, the security log storage unit 109, and a mask table storage unit 210. The control unit 202 implements, using hardware and/or software, the alive monitoring log recording unit 103, the unacquired alive monitoring log recording unit 104, and a masking unit 206.

The masking unit 206 (corresponding to the "invalidation unit") "invalidates" a record of the unacquired alive monitoring log in the alive monitoring table when the unacquired period of the unacquired alive monitoring log is a "predetermined period" "or longer". In the present embodiment, the masking unit 206 performs invalidation by recording the unacquired alive monitoring log in a masking "table" that masks elements in the alive monitoring table. Here, the "table" is not limited to a table format as long as the table is a collection of data.

FIG. 10 is a diagram showing the masking table. For example, in FIG. 7, the alive monitoring log #4 is acquired when the last trip acquired is the trip number 5, and as indicated by the number of unacquired trips (C), there are five consecutive trips in which the alive monitoring log #4 is not acquired. Therefore, the masking unit 206 records the alive monitoring log #4 in the masking table in order to mask a column of the alive monitoring log #4 of the alive monitoring table.

As for contents to be recorded in the masking table, for example, 0 may be written in the column corresponding to the alive monitoring log #4 in FIG. 7, so that the alive monitoring log #4 may be recorded. Further, by using the masking table superimposed on the alive monitoring table, the record of the alive monitoring log #4 of the alive monitoring table is invalidated.

(Operation of Log Management Device 200)

An operation of the log management device 200 is basically the same as that of FIG. 8 showing the operation of the log management device 100 according to Embodiment 1 except for the specific operations of S104 and S105, and thus the description of Embodiment 1 and FIG. 8 will be cited.

The masking unit 206 compares the unacquired period of the unacquired alive monitoring log with a predetermined period (S104). When the unacquired period is equal to or longer than the predetermined period (S104: Y), the masking unit 206 invalidates the record of the unacquired alive monitoring log in the alive monitoring table, that is, records the unacquired alive monitoring log in the masking table (S105). When the unacquired period is shorter than the predetermined period (S104: N), the processing ends.

As described above, according to the present embodiment, since the electronic control unit constituting the electronic control system is identified using the alive monitoring log, it is not necessary to have information of the electronic control unit constituting the electronic control system in advance. It is possible to identify the ECU removed from the electronic control system or the failed ECU by identifying the unacquired alive monitoring log based on an acquisition state of the alive monitoring log. Further, when the unacquired period of the unacquired alive monitoring log is equal to or longer than the predetermined period, the unacquired monitoring log is recorded in the masking table, and therefore, by using the alive monitoring table and the masking table together, the electronic control unit that actually constitutes the electronic control system can be identified. Therefore, it is possible to reduce a determination target of an abnormality detection pattern of a cyber attack and to reduce calculation required for identifying a type of the cyber attack.

Modification

Modification 1 and Modification 2 of Embodiment 1 can also be applied to the present embodiment.

Embodiment 3

(Configuration of Log Management Device 300)

The log management device 300 according to the present embodiment is obtained by adding a configuration of an external input and output unit 308 to the log management device 100 in Embodiment 1 or the log management device 200 in Embodiment 2.

Figure 11:
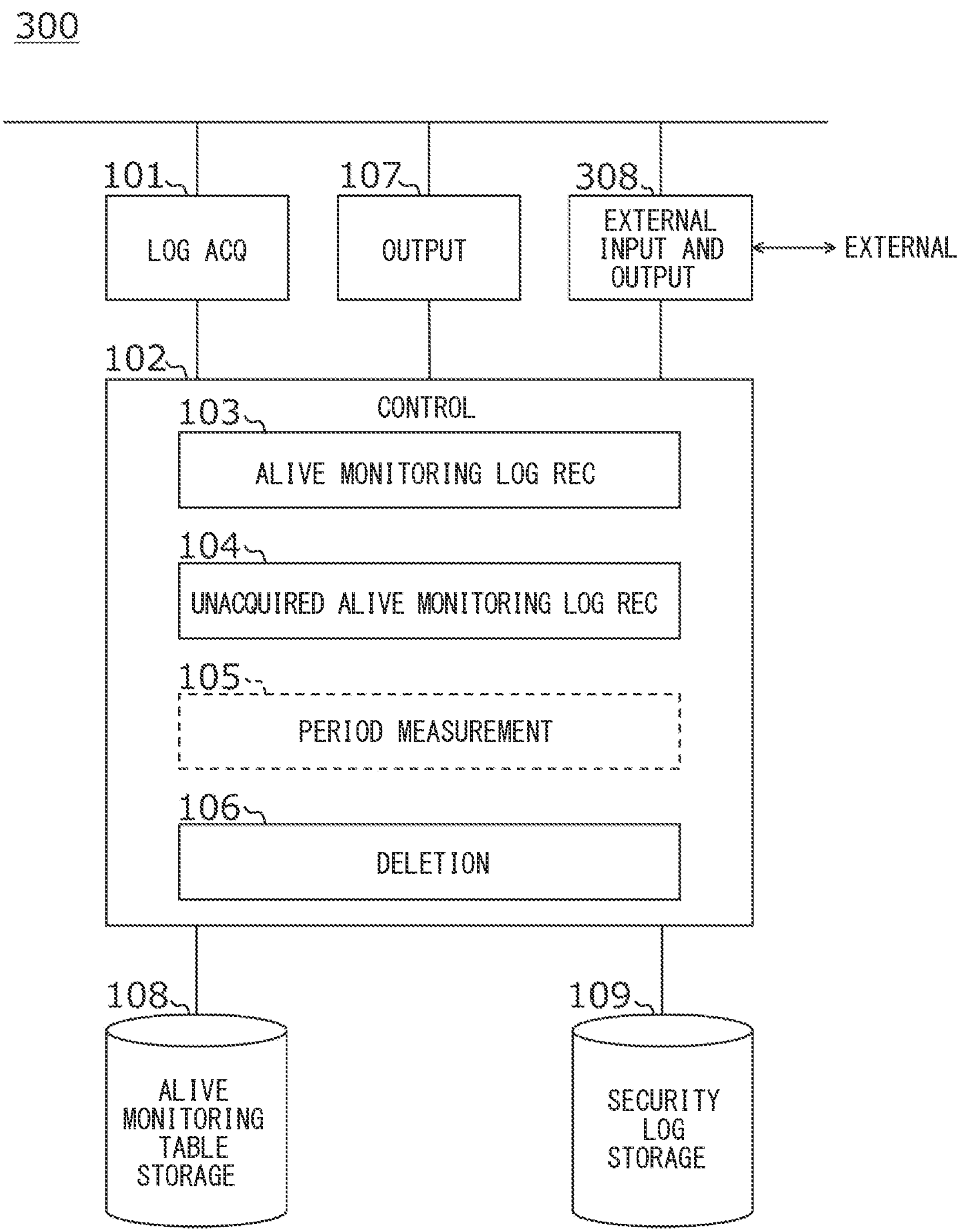
FIG. 11 is a block diagram showing a configuration example of a log management device according to Embodiment 3.

FIG. 11 is a block diagram showing a configuration of the log management device 300 according to the present embodiment. Configurations same as those of the log management device 100 in Embodiment 1 shown in FIG. 6 are denoted by the same reference numerals as those in FIG. 6, and the description of Embodiment 1 is cited. The log management device 300 includes the log acquisition unit 101, the control unit 102, the output unit 107, the external input and output unit 308, the alive monitoring table storage unit 108, and the security log storage unit 109.

The external input and output unit 308 is an interface for accessing the alive monitoring table from outside the vehicle, and software, a module, and the like related thereto. For example, a diagnostic tool used for diagnosing the electronic control system S is connected using wired communication. Alternatively, a remote diagnosis device that performs diagnosis using communication from a remote location is connected by a method using wireless communication. Although FIG. 11 shows a case in which the external input and output unit 308 is directly connected to devices external to the vehicle without going through an in-vehicle network, the external input and output unit 308 may be connected to devices external to the vehicle via the in-vehicle network using other communication devices such as the external communication ECU 10*b*.

In the present embodiment, when the external input and output unit 308 accesses the alive monitoring table from outside the vehicle by a method using the wireless communication, the external input and output unit 308 permits reading of the alive monitoring table but prohibits erasing of the alive monitoring table. A change in the alive monitoring table may also be prohibited. Other settings may be made, such as prohibiting reading.

In the present embodiment, when the external input and output unit 308 accesses the alive monitoring table from outside the vehicle by a method using the wired communication, the external input and output unit 308 permits reading and erasing of the alive monitoring table. A change in the alive monitoring table may also be permitted. Other settings may be made, such as prohibiting erasing.

In this way, by setting permission or prohibition of reading, erasing, or changing of the alive monitoring table according to the communication method used by the external input and output unit 308, it is possible to prevent falsification or destruction of the alive monitoring table by impersonation.

When the alive monitoring table is read from outside the vehicle via the external input and output unit 308, the external input and output unit 308 outputs the alive monitoring table stored in the alive monitoring table storage unit 108. The external input and output unit 308 may output the alive monitoring table as it is, or may convert the alive monitoring table into a format used for communication with the outside and output the obtained table.

The external input and output unit 308 may output an alive monitoring table including the number of event identification IDs (corresponding to "identification information") recorded in the alive monitoring table. FIG. 12 is an example of the alive monitoring table output from the external input and output unit 308. According to the example, the external input and output unit 308 outputs 3 as the number of event identification IDs since the number of event identification IDs recorded in the output alive monitoring table is three. The alive monitoring logs recorded in the alive monitoring table are output in numerical order. In this way, by outputting the number of event identification IDs, it is possible to check whether there is a defect in the alive monitoring table received by a diagnostic tool or the like.

In the present embodiment, the number of event identification IDs is generated by the external input and output unit 308, and may be generated by the alive monitoring log recording unit 103.

(Operation of Log Management Device 300)

Figure 13:
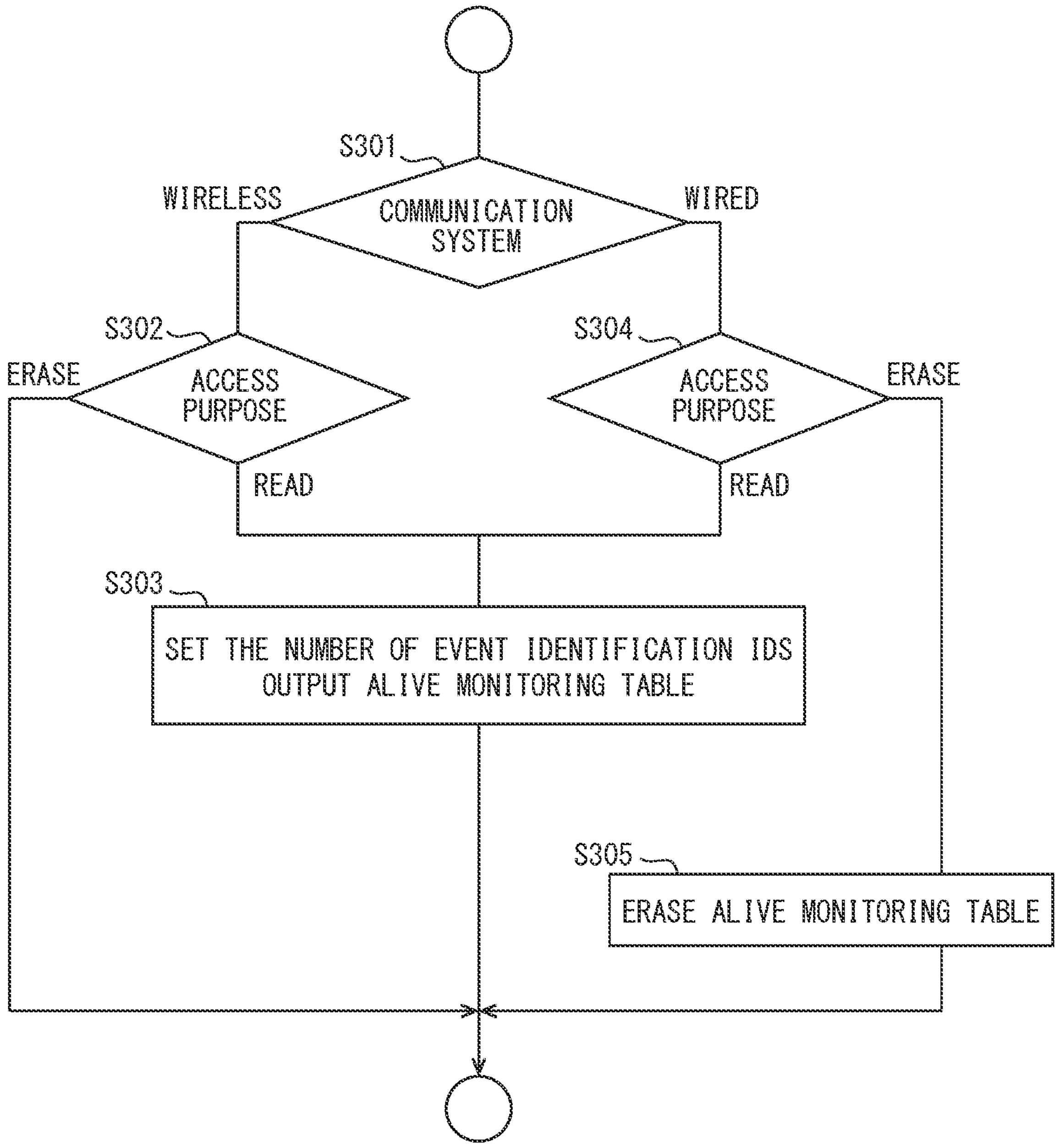
FIG. 13 is a flowchart showing an operation of the log management device according to Embodiment 3.

Next, an operation of the log management device 300 will be described with reference to FIG. 13. FIG. 13 shows an operation when there is an access from an external device or the like via the external input and output unit 308. The external input and output unit 308 detects whether the connected external device or the like is accessing by a method using wireless communication or accessing by a method using wired communication (S301). When accessing by the method using the wireless communication (S301: wireless), the external input and output unit 308 detects an access purpose (S302). When the access purpose is to read (S302: read), the external input and output unit 308 sets the number of event identification IDs recorded in the alive monitoring table stored in the alive monitoring table storage unit 107, and outputs the alive monitoring table including the number of event identification IDs (S303). When the access purpose is to erase (S302: erase), the external input and output unit 308 prohibits the erasing of the alive monitoring table and does not permit the access. On the other hand, when accessing by the method using the wired communication (S301: wired), the external input and output unit 308 detects an access purpose (S304). When the access purpose is to read (S304: read), the external input and output unit 308 performs the processing same as in S303. When the access purpose is to erase (S304: erase), the external input and output unit 308 permits the erasing of the alive monitoring table, and the alive monitoring table is erased.

As described above, according to the present embodiment, by setting the permission or the prohibition of reading or erasing of the alive monitoring table according to the communication method used by the external input and output unit, it is possible to prevent falsification or destruction of the alive monitoring table by impersonation.

The features of the log management device and the like according to the embodiments of the present disclosure have been described above.

Since terms used in the embodiments are examples, the terms may be replaced with synonymous terms or terms including synonymous functions.

The block diagrams used for the description of the embodiments are obtained by classifying and organizing the configurations of the devices for each function. The blocks representing the respective functions may be implemented by any combination of hardware or software. Since the blocks represent the functions, such a block diagram may also be understood as disclosures of a method and a disclosure of a program for implementing the method.

An order of functional blocks that can be understood as processes, flows, and methods described in the embodiments may be changed as long as there are no restrictions such as a relation in which results of preceding steps are used in one other step.

The terms such as first, second, to N-th (where N is an integer) used in each embodiment and in the disclosure are used to distinguish two or more configurations and methods of the same kind and are not intended to limit the order or superiority.

Examples of forms of the log management device in the present disclosure include the following forms. Examples of a form of a component include a semiconductor device, an electronic circuit, a module, and a microcomputer. Examples of a form of a semi-finished product include an electric control unit (ECU) and a system board. Examples of a form of a finished product include a cellular phone, a smartphone, a tablet computer, a personal computer (PC), a workstation, and a server. In addition, the devices may include a device having a communication function or the like, and examples thereof include a video camera, a still camera, and a car navigation system.

Necessary functions such as an antenna or a communication interface may be added to the log management device.

The log management device according to the present disclosure is assumed to be used particularly on a server for the purpose of providing various services. In conjunction with providing such services, the log management device according to the present disclosure is used, the method of the present disclosure is used, or/and the program of the present disclosure is executed.

The present disclosure can be implemented not only by dedicated hardware having the configurations and functions described in the embodiments, but also by a combination of a program, which is recorded on a recording medium such as a memory or a hard disk and is used for implementing the present disclosure, and general-purpose hardware that has a dedicated or general-purpose CPU that can execute the program, a memory, and the like.

A program stored in a non-transitory tangible storage medium (for example, an external storage device (a hard disk, a USB memory, and a CD/BD) of dedicated or general-purpose hardware, or an internal storage device (a RAM, a ROM, and the like)) may also be provided to dedicated or general-purpose hardware via the recording medium or from a server via a communication line without using the recording medium. Accordingly, the latest functions can be provided at all times through program upgrade.

The log management device according to the present disclosure is mainly intended for a device that analyzes a cyber attack received by an electronic control system mounted on an automobile, and may be intended for a device that analyzes an attack on a normal system not mounted on an automobile.

What is claimed is:

1. A log management device comprising at least one of (i) a circuit and (ii) a processor with a memory storing computer program code executable by the processor, the at least one of the circuit and the processor configured to cause the log management device to implement:

a log acquisition unit configured to acquire an alive monitoring log indicating that a security sensor of an electronic control unit mounted on a vehicle is operating;

an alive monitoring log recording unit configured to record acquisition of the alive monitoring log in an alive monitoring table;

an unacquired alive monitoring log recording unit configured to identify an unacquired alive monitoring log which is not acquired by the log acquisition unit, and record, in the alive monitoring table, an unacquired period during which the unacquired alive monitoring log is not acquired; and an invalidation unit configured to invalidate a record of the unacquired alive monitoring log in the alive monitoring table when the unacquired period of the unacquired alive monitoring log is equal to or longer than a predetermined period.

2. The log management device according to claim 1, wherein the invalidation unit performs invalidation by deleting the record of the unacquired alive monitoring log from the alive monitoring table.

3. The log management device according to claim 1, wherein the invalidation unit performs invalidation by recording the unacquired alive monitoring log in a masking table that masks elements in the alive monitoring table.

4. The log management device according to claim 1, wherein the alive monitoring table is empty when the vehicle is started for a first time.

5. The log management device according to claim 1, wherein a known alive monitoring log is registered in the alive monitoring table when the vehicle is started for a first time.

6. The log management device according to claim 1, wherein the predetermined period is defined in unit of a trip, which is a period from start of the log management device to termination of the log management device or a period from ignition ON to ignition OFF of the vehicle.

7. The log management device according to claim 6, wherein the predetermined period is defined as a case in which the trip consecutively occurs a predetermined number of times.

8. The log management device according to claim 1, wherein the at least one of the circuit and the processor is further configured to cause the log management device to implement:

a period measurement unit configured to measure the predetermined period.

9. The log management device according to claim 1, wherein the alive monitoring log is generated by the security sensor at a constant cycle.

10. The log management device according to claim 1, wherein the alive monitoring log recording unit records identification information of the alive monitoring log in the alive monitoring table.

11. The log management device according to claim 1, wherein the at least one of the circuit and the processor is further configured to cause the log management device to implement:

an output unit configured to output a detection log to an external device when the unacquired period of the unacquired alive monitoring log is equal to or longer than a predetermined period.

12. The log management device according to claim 1, wherein the at least one of the circuit and the processor is further configured to cause the log management device to implement:

an external input and output unit configured to access the alive monitoring table from outside the vehicle.

13. The log management device according to claim 12, wherein reading of the alive monitoring table is permitted in both cases in which the external input and output unit accesses the alive monitoring table from outside the vehicle by a method using wireless communication and in which the external input and output unit accesses the alive monitoring table from outside the vehicle by a method using wired communication.

14. The log management device according to claim 13, wherein when the alive monitoring table is read via the external input and output unit, the external input and output unit outputs the alive monitoring table including a total number of pieces of identification information of the alive monitoring logs recorded in the alive monitoring table.

15. The log management device according to claim 12, wherein when the external input and output unit accesses the alive monitoring table from outside the vehicle by a method using wireless communication, deletion of the alive monitoring table is prohibited, and when the external input and output unit accesses the alive monitoring table from outside the vehicle by a method using wired communication, the deletion of the alive monitoring table is permitted.

16. The log management device according to claim 1, wherein the log management device is mounted on the vehicle.

17. An electronic control system comprising:

an electronic control unit mounted on a vehicle; and a log management device connected to the electronic control unit, wherein the electronic control unit is configured to generate an alive monitoring log indicating that a security sensor is operating, and transmit the alive monitoring log, and the log management device includes at least one of (i) a circuit and (ii) a processor with a memory storing computer program code executable by the processor, the at least one of the circuit and the processor configured to cause the log management device to implement:

a log acquisition unit configured to acquire the alive monitoring log, an alive monitoring log recording unit configured to record acquisition of the alive monitoring log in an alive monitoring table, an unacquired alive monitoring log recording unit configured to identify an unacquired alive monitoring log which is not acquired by the log acquisition unit, and record, in the alive monitoring table, an unacquired period during which the unacquired alive monitoring log is not acquired, and an invalidation unit configured to invalidate a record of the unacquired alive monitoring log in the alive monitoring table when the unacquired period of the unacquired alive monitoring log is equal to or longer than a predetermined period.

18. A log management method executed by a log management device including at least one of (i) a circuit and (ii) a processor with a memory storing computer program code executable by the processor, comprising:

acquiring an alive monitoring log indicating that a security sensor of an electronic control unit mounted on a vehicle is operating;

recording acquisition of the alive monitoring log in an alive monitoring table;

identifying an unacquired alive monitoring log which is not acquired, and recording, in the alive monitoring table, an unacquired period during which the unacquired alive monitoring log is not acquired; and invalidating a record of the unacquired alive monitoring log in the alive monitoring table when the unacquired period of the unacquired alive monitoring log is equal to or longer than a predetermined period.

19. A non-transitory computer-readable storage medium storing a log management program executable by a log management device including at least one of (i) a circuit and (ii) a processor with a memory storing computer program code executable by the processor, the log management program comprising:

acquiring an alive monitoring log indicating that a security sensor of an electronic control unit mounted on a vehicle is operating;

recording acquisition of the alive monitoring log in an alive monitoring table;

identifying an unacquired alive monitoring log which is not acquired, and recording, in the alive monitoring table, an unacquired period during which the unacquired alive monitoring log is not acquired; and invalidating a record of the unacquired alive monitoring log in the alive monitoring table when the unacquired period of the unacquired alive monitoring log is equal to or longer than a predetermined period.

* * * * *